US011815591B2

(12) United States Patent
Wolf et al.

(10) Patent No.: US 11,815,591 B2
(45) Date of Patent: Nov. 14, 2023

(54) DISTANCE ESTIMATION METHOD IN AN LPWA NETWORK AND A POSITION ESTIMATION METHOD ASSOCIATED THEREWITH (71) Applicant: COMMISSARIAT A L'ENERGIE ATOMIQUE ET AUX ENERGIES ALTERNATIVES, Paris (FR)

(72) Inventors: Florian Wolf, Grenoble (FR); Sébastien De Rivaz, Grenoble (FR); François Dehmas, Grenoble (FR); Mohamed Sana, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 630 days.

(21) Appl. No.: 17/018,267

(22) Filed: Sep. 11, 2020

(65) Prior Publication Data
US 2021/0080559 A1 Mar. 18, 2021

(30) Foreign Application Priority Data

Sep. 13, 2019 (FR) ...................................... 19 10164

(51) Int. Cl.
G01S 13/87 (2006.01)
G16Y 10/75 (2020.01)
(Continued)

(52) U.S. Cl.
CPC .......... *G01S 13/876* (2013.01); *G01S 13/762* (2013.01); *G06F 18/2155* (2023.01); *G06N 3/04* (2013.01);
(Continued)

(58) Field of Classification Search
CPC .. H04L 25/0202; H04L 25/022; H04W 64/00; G01S 5/0273; G01S 5/06;
(Continued)

(56) References Cited

U.S. PATENT DOCUMENTS 8,374,262 B2 * 2/2013 Galda ................. H04L 25/0236
375/259
9,319,840 B2 * 4/2016 Porzio Giusto ....... H04W 4/023
(Continued)

FOREIGN PATENT DOCUMENTS

DE 102017011879 A1 * 6/2019 ................ G01P 1/00
JP 6273546 B2 * 2/2018

OTHER PUBLICATIONS

Wolf Florian et al: "Coherent Multi-Channel Ranging for Narrowband LPWAN: Simulation and Experimentation Results", 2018 15th Workshop on Positioning, Navigation and Communications (WPNC), IEEE, (Oct. 25, 2018), pp. 1-6, XP033460376.
(Continued)

Primary Examiner — Timothy A Brainard
Assistant Examiner — Michael W Justice
(74) Attorney, Agent, or Firm — Oblon, McClelland, Maier & Neustadt, L.L.P.

(57) ABSTRACT

The present invention relates to a method for estimating a distance between nodes of an LPWA network. First and second nodes, respectively, successively transmit a narrow band signal at a plurality of carrier frequencies to each other. The second and first nodes, respectively, receive the transmitted signals and demodulate them into baseband signals. Complex values representative of a forward-backward function of the transmission channel between two nodes are obtained from the baseband demodulated signals. These complex values are then provided to a previously supervisingly trained neural network, the neural network giving an
(Continued)

estimation of the distance separating the first node and the second node. The present invention also relates to a method for estimating the position of a node in an LPWA network using the above-noted distance estimation method.

13 Claims, 6 Drawing Sheets (51) Int. Cl.
   *G16Y 40/60* (2020.01)
   *G01S 13/76* (2006.01)
   *G06N 3/04* (2023.01)
   *G06N 3/08* (2023.01)
   *G06F 18/214* (2023.01)

(52) U.S. Cl.
   CPC .............. *G06N 3/08* (2013.01); *G16Y 10/75* (2020.01); *G16Y 40/60* (2020.01)

(58) Field of Classification Search
   CPC ........ G01S 5/00; G01S 13/003; G01S 13/876; G01S 13/762; G06N 3/08; G06N 3/045; G06N 3/04
   USPC ......................................... 455/456.1; 342/125
   See application file for complete search history.

(56) References Cited

U.S. PATENT DOCUMENTS

| | | | | |
|---|---|---|---|---|
| 10,051,423 B1* | 8/2018 | Feinmesser | ........... | H04L 47/283 |
| 10,473,756 B2* | 11/2019 | Nakayama | .............. | G01S 7/292 |
| 10,615,495 B1* | 4/2020 | Loui | ....................... | H01Q 3/267 |
| 11,163,057 B2* | 11/2021 | Iizuka | .................... | G01S 13/003 |
| 11,486,990 B2* | 11/2022 | Eggert | ..................... | G01S 11/02 |
| 11,503,425 B2* | 11/2022 | Eggert | ....................... | G01S 5/06 |
| 2010/0118993 A1* | 5/2010 | Galda | .................. | H04L 25/0236 |
| | | | | 375/260 |
| 2013/0310074 A1* | 11/2013 | Porzio | ..................... | G01S 11/02 |
| | | | | 455/456.1 |
| 2018/0011169 A1* | 1/2018 | Nakayama | .............. | G01S 13/42 |
| 2019/0339379 A1* | 11/2019 | Iizuka | ..................... | G01S 13/04 |
| 2020/0252814 A1* | 8/2020 | Eggert | .................. | G01S 13/767 |
| 2020/0408868 A1* | 12/2020 | Eggert | ................... | H04B 1/525 |

OTHER PUBLICATIONS

Bregar Klemen et al: II Improving Indoor Localization Using Convolutional Neural Networks on Computationally Restricted Devices, IEEE Access, vol. 6 (Mar. 21, 2018), pp. 17429-17441,XP0I1681588.

Kobus Van Der Merwe et al: "RF-Echo A Non-Line-of-Sight Indoor Localization System Using a Low-Power Active RF Reflector ASIC Tag", Proceedings of the 23rd Annual International Conference on Mobile Computing and Networking , MOBICOM '17, (Oct. 4, 2017), pp. 222-234, XP055694379, New York, USA.

M. Pichler et al.: « Multi-channel distance measurement with IEEE 802.15.4 (ZigBee) devices » , IEEE Journal of Selected Topics in Signal Processing , vol. 3, No. 5, Oct. 2009, pp. 845-859.

O. Bialer et al. : « A deep neural network approach for time-of-arrival estimation in multipath channels » , Proc. of ICASSP Conference, Apr. 2018, pp. 2936-2940.

* cited by examiner

Fig. 1

*M* values of the forward-backward transfer function

DISTANCE ESTIMATION METHOD IN AN LPWA NETWORK AND A POSITION ESTIMATION METHOD ASSOCIATED THEREWITH

TECHNICAL FIELD

The present invention generally relates to the field of narrow band Low Power Wide Area (LPWA) networks such as the LoRa, SigFox and NB-IoT networks. It also relates to the field of machine learning and more particularly to that of deep learning.

STATE OF PRIOR ART

The geolocation of connected objects has become an important issue in the field of IoT (Internet of Things). Especially, it enables information transmitted by these objects to be enriched by location information, the network to be more efficiently managed and geographic tracking applications to be developed when the objects are mobile.

A first geolocation possibility consists in equipping connected objects with GNSS (Global Navigation Satellite System) reception modules. However, this option is expensive and is generally not compatible with very strict energy consumption requirements of these objects. Further, it is excluded when the connected objects are deployed in an indoor environment.

A second geolocation possibility is to perform trilateration from radio signals transmitted by the connected objects and received by different base stations. However, signals transmitted in the LPWA networks, irrespective of whether they use a licensed (NB-IoT) or unlicensed (SigFox, LoRa) band are with a low rate and narrow band to propagate over long distances (up to several kilometres). The radio signals transmitted being with a narrow band results in a significant inherent limitation in the resolution of times of arrival (ToA) of these signals and thus in a low distance resolution in the position of the connected objects. This low time resolution can especially result in large position errors when transmission channels are of the multi-path type, in so far as the different paths cannot be discriminated from each other.

In the radar field, it is known to measure a distance to a target by using a plurality of narrow band signals, so as not to resort to high frequency ADC (Analogue Digital Converters). More precisely, this technique (known as stepped frequency radar), consists in varying through successive hops the carrier frequency of the transmitted signal while keeping an instantaneous narrow band, the complex response being then measured for each carrier frequency. By coherently combining the measurements, more precisely by performing a reverse Fourier transform of the measurements thus obtained, a pulse response of the channel is obtained in the time domain. The time resolution is thus inversely proportional to the width of the virtual frequency band scanned and no longer proportional of the instantaneous bandwidth. A similar technique, called "coherent multi-channel ranging", has been applied in LR WPAN (Low Rate Wireless Personal Area Network) networks to determine the position of ZigBee transponders, as described in the paper of M. Pichler et al. entitled "*Multi-channel distance measurement with IEEE 802.15.4 (ZigBee) devices*" published in IEEE Journal of Selected Topics in Signal Processing, Vol. 3, No. 5, October 2009, pp. 845-859. However, the aforesaid article resorts to strong restrictive hypotheses on the propagation scenario, namely a line of sight (LOS) situation and the absence of multi-path.

The coherent multi-channel distance determination cannot be applied as such to LPWA networks. Indeed, the scanned virtual frequency band is subjected to regulatory requirements in the ISM band (at most 7 MHz can be used in the 868 MHz band), which limits time resolution and does not allow satisfactory resolution of multi-paths as previously indicated.

Recent advances in the field of machine learning have opened up new horizons in the field of the distance determination within wireless networks. In particular, the paper by O. Bialer et al. entitled "*A deep neural network approach for time-of-arrival estimation in multipath channels*" published in Proc. of ICASSP Conference, April 2018, pages 2936-2940, suggested the use of an artificial neural network to determine the time of arrival of an OFDM signal from samples of the preamble signal. After learning, the neural network enables a correct estimation of the time of arrival to be obtained even in the presence of a high multi-path density. However, if this technique is satisfactory for OFDM signals, it cannot be applied to narrow band signals such as those transmitted in LPWA networks.

The paper by F. Wolf et al. entitled "Coherent multi-channel ranging for narrowband LPWAN: simulation and experimentation results" published in Proc. 2018 15th IEEE Workshop on positioning, navigation and communication, 25 Oct. 2018 mentions the possibility of using a neural network to estimate a distance between two nodes of an LPWA network from characteristics of the transfer function for a plurality of channels.

One object of the present invention is consequently to provide a method for estimating a distance or, equivalently a propagation time also called time of flight (ToF) between nodes of an LPWA network, which enables a better spatial (time resp.) resolution than that obtained in the state of the art to be obtained, in particular when transmission channels are of the multi-path type. A subsidiary object of the present invention is to provide a method for estimating a position of a node in an LPWA network using said distance estimation method.

DISCLOSURE OF THE INVENTION

The present invention is defined by a distance estimation method as set out in claim 1. Advantageous embodiments are given in the dependent claims 2-6.

The present invention also relates to a method for estimating a position of a node of interest in an LPWA network using said distance estimation method.

BRIEF DESCRIPTION OF THE DRAWINGS

Further characteristics and advantages of the invention will appear upon reading a preferential embodiment of the invention, described with reference to the appended figures in which.

DETAILED DISCLOSURE OF PARTICULAR EMBODIMENTS

In the following, an LPWA (Low Power Wide Area) network will be considered as set forth in the introductory part, for example a LoRa, SigFox or NB-IoT network. These networks have especially the characteristic of using narrow band (typically about one hundred Hz to about one hundred kHz) signals with a low rate to allow long-range (typically from one km to a few tens kms) communications.

The nodes of an LPWA network comprise, on the one hand, connected objects and, on the other hand, base stations. A connected object served by a base station exchanges with the same data packets on a transmission channel which is generally of the multi-path type.

Figure 1:
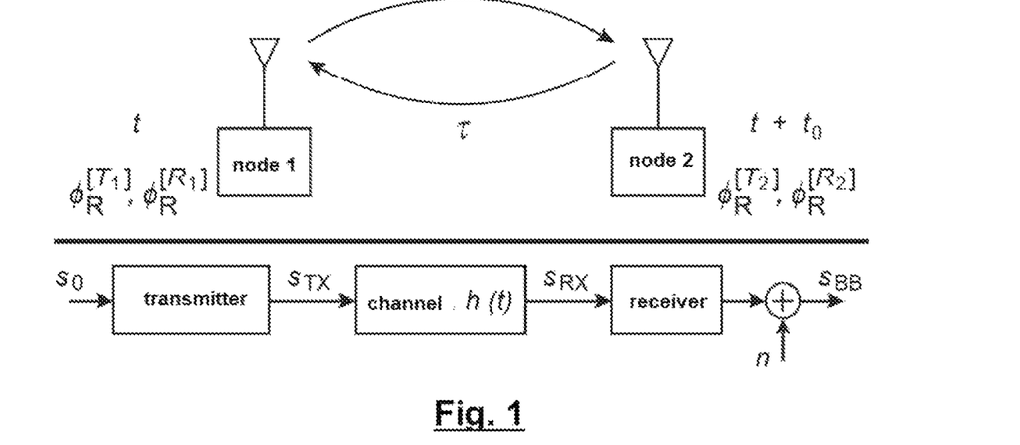
FIG. 1 schematically represents a measurement of forward-backward flight phase between two nodes of an LPWA network.

In FIG. 1, two nodes 1, 2 of an LPWA network (for example a base station in 1 and a connected object in 2) are represented, each node being equipped with a radio transceiver. Both nodes communicate via a pulse response transmission channel h(t).

The signal transmitted by a node is generically noted as $s_{TX}(t)$ and can be written as:

$$s_{TX}(t) = s_0(t_T(t))e^{j(2\pi f_0 t_T(t)+\phi_T)} \quad (1)$$

$s_0$ is the baseband signal, $t_T(1)$ is the time at the transmitter which generally differs from real time t because of a synchronisation fault of the local clock, $\phi_T$ is the phase at the origin of the transmission, $f_0$ is the carrier frequency.

The signal received by the receiver node after transmission on the channel is given by:

$$s_{RX}(t) = s_{TX}(t) * h(t) \quad (2)$$

where the symbol * represents the convolution operation.

The transmission channel is supposed to include P paths, that is:

$$h(t) = \sum_{p=0}^{P-1} \alpha_p \delta(t-\tau_p) \quad (3)$$

where $\alpha_p$, $\tau_p$, p=0, ..., P−1 are the attenuation coefficients and delays of the different paths respectively. The line of sight (LOS) path corresponds to the delay $\tau_0$ and the distance wanted between transmitter and receiver is given by $d=c\tau_0$ where c is the propagation speed of light.

The transfer function of the transmission channel is given by:

$$H(f) = \sum_{p=0}^{P-1} \alpha_p e^{-j2\pi f \tau_p} \quad (4)$$

The signal received by the receiver node after translation into baseband can be written as:

$$s_{BB}(t) = s_{RX}(t)e^{-j(2\pi f_0 t_R(t)+\phi_R)} \quad (5)$$

where $t_R(t)$ is the time at the receiver which generally differs from real time t because of a synchronisation fault of the local clock, and $n_R$ is a term of noise supposed to be an additive white Gaussian noise.

If expressions (1), (2) and (5) are combined with each other, the baseband received signal is finally given by:

$$s_{BB}(t) = [s_0(t_T(t))e^{j(2\pi f_0 t_T(t)+\phi_T)} * h(t)]e^{-j(2\pi f_0 t_R(t)+\phi_R)} + n_R(t) \quad (6)$$

Each of the nodes 1 and 2 can transmit a signal $s_{TX}(t)$ and receive the signal transmitted by the other node. In the following, the transmission/reception parameters relating to the node 1 will be assigned index 1 and those relating to node 2 will be assigned index 2. Further, without loss of generality, the time reference will be conventionally taken as the local time of node 1, in other words:

$$t_{T1}(t) = t_{R1}(t) = t \quad (7\text{-}1)$$

and $$t_{T2}(t) = t_{R2}(t) = t + t_0 \quad (7\text{-}2)$$

where $t_0$ is the time offset between node 2 and node 1. It is also assumed that the nodes have no carrier frequency offset and sampling offset, or that these offsets have been estimated and compensated for. With these conventions, the signal transmitted by node 1 and received by node 2, is written, after baseband translation:

$$s_{BB}^{T1\to R2}(t) = [s_0(t)e^{j(2\pi f_0 t+\phi_{T1})} * h(t)]e^{-j(2\pi f_0(t+t_0)+\phi_{R2})} + n_{R2}(t) \quad (8\text{-}1)$$

and, conversely, the signal transmitted by node 2 and received by node 1:

$$s_{BB}^{T2\to R1}(t) = [s_0(t)e^{j(2\pi f_0(t+t_0)+\phi_{T2})} * h(t)]e^{-j(2\pi f_0 t+\phi_{R1})} + n_{R1}(t) \quad (8\text{-}2)$$

In frequency representation, expressions (8-1) and (8-2) respectively become, if noise terms are disregarded:

$$S_{BB}^{T1\to R2}(f) = S_0(f)H(f+f_0)e^{-j2\pi f_0 t_0}e^{j(\phi_{T1}-\phi_{R2})} \quad (9\text{-}1)$$

and $$S_{BB}^{T2\to R1}(f) = S_0(f)H(f+f_0)e^{j2\pi f_0 t_0}e^{j(\phi_{T2}-\phi_{R1})} \quad (9\text{-}2)$$

The transfer function of the transmission channel, after baseband translation is consequently, for a transmission from node 1 to node 2, which is the direction conventionally taken as the forward direction:

$$H_{BB}^{T1\to R2}(f) = H(f+f_0)e^{-j2\pi f_0 t_0}e^{j(\phi_{T1}-\phi_{R2})} \quad (10\text{-}1)$$

and, reversely, for a transmission from node 2 to node 1, a direction conventionally taken as the backward direction:

$$H_{BB}^{T2\to R1}(f) = H(f+f_0)e^{j2\pi f_0 t_0}e^{j(\phi_{T2}-\phi_{R1})} \quad (10\text{-}2)$$

These transfer functions take the following values at the zero frequency (baseband DC component):

$$H_{BB}^{T1\to R2}(0) = \quad (11\text{-}1)$$
$$H(f_0)e^{-j2\pi f_0 t_0}e^{j(\phi_{T1}-\phi_{R2})} = e^{j(\phi_{T1}-\phi_{R2})}\sum_{p=0}^{P-1}\alpha_p e^{-j2\pi f_0(\tau_p+t_0)}$$

$$H_{BB}^{T2\to R1}(0) = \quad (11\text{-}2)$$
$$H(f_0)e^{j2\pi f_0 t_0}e^{j(\phi_{T2}-\phi_{R1})} = e^{j(\phi_{T2}-\phi_{R1})}\sum_{p=0}^{P-1}\alpha_p e^{-j2\pi f_0(\tau_p-t_0)}$$

$H_{BB}^{T1 \to R2}(0)$ and $H_{BB}^{T2 \to R1}(0)$ represent the complex value taken by the transfer function at the carrier frequency $f_0$ of the transmission channel in the forward direction and in the backward direction respectively, in the absence of node synchronisations. They will be noted $\tilde{H}^A(f_0)$ and $\tilde{H}^R(f_0)$ respectively in the following.

When the nodes are not synchronised ($t_0$ is not zero), which is generally the case, a transmission in either direction only does not enable the distance separating both nodes to be estimated because it is not possible to dissociate $\tau_0$ and $t_0$ in expressions (11-1) and (11-2).

However, it is possible to dispense with the absence of synchronisation between nodes by performing a forward-backward transmission on the channel, the product of the values of the transfer functions at the carrier frequency $f_0$ in the forward and backward directions giving:

$$\tilde{H}^{AR}(f_0) = \tilde{H}^A(f_0) \cdot \tilde{H}^R(f_0) = H^2(f_0) e^{j[(\phi_{T1} - \phi_{R2}) + (\phi_{T2} - \phi_{R1})]} \quad (12)$$

Transmission in the backward direction may not immediately succeed transmission in the forward direction. The only requirement here is that the time deviation between both forward and backward transmission time instants is lower than the coherence time of the channel.

Irrespective of whether the nodes are synchronised or not, the transfer function of the transmission channel, including baseband translation, is measured for a plurality M of carrier frequencies, preferably equally distributed on a virtual pass band with a width $BW_{virt} = (M-1)\Delta f$ where $\Delta f$ is the deviation between successive frequencies. The transmitter (or pair of transmitters in the case of a forward-backward transmission) performs transmissions at frequencies $f_0^{(m)} = f_{ref} + m\Delta f$, $m = 0, \ldots, M-1$ where $f_{ref}$ is a predetermined reference frequency. The value taken by the forward or backward transfer function in the absence of synchronisation, that is the baseband DC component expressed by (11-1) or (11-2) when the carrier frequency takes the value $f_0^{(m)} = f_{ref} + m\Delta f$ will be conventionally noted as $\tilde{H}(m) = \tilde{H}(f_0^{(m)})$. Likewise, the value taken by the forward-backward transfer function expressed by (12) when the carrier frequency takes the value $f_0^{(m)} = f_{ref} + m\Delta f$ will be conventionally noted as $\tilde{H}^{AR}(m) = \tilde{H}^{AR}(f_m^{(0)})$.

Figure 2:
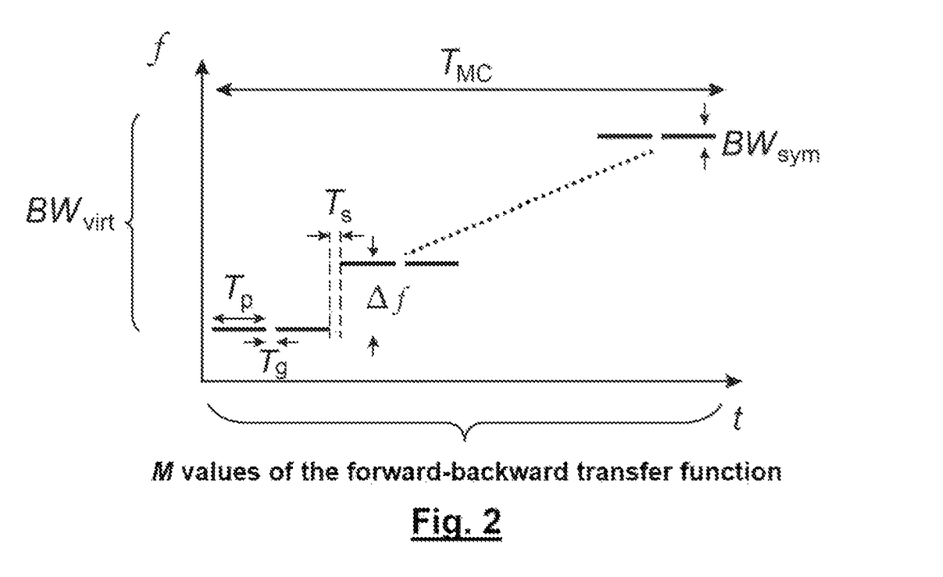
FIG. 2 represents an example of scanning a virtual band over time by a pair of nodes of LPWA network.

FIG. 2 represents an example of scanning a virtual band over time by a pair of nodes of an LPWA network.

In this example, scanning the virtual band with a width $BW_{virt}$ is performed by frequency hops with a value $\Delta f$. The instantaneous bandwidth is noted as $BW_{sym}$ (typically from about one hundred Hz to about one hundred kHz as previously indicated). Transmission of each packet lasts for a time $T_p$, a guard time $T_g$ being generally observed between a forward transmission and a backward transmission on the same propagation channel and a time $T_s$ being observed to switch from one frequency to next one. The total scanning duration is consequently $T_{MC} = M(2T_p + T_g + T_s)$.

It will be noted that for the purpose of coherently combining the measurements at the different frequencies, the duration $T_{MC}$ will be advantageously chosen at the coherence time of the channel.

Carrier frequency scanning is not necessarily monotonic (increasing or decreasing) but can obey any order. In any case, at the end of scanning, a plurality of complex values characteristic of the forward-backward transfer function of the transmission channel between both nodes are available at a plurality M of frequencies.

In a first example, the complex values can be given by:

$$\tilde{H}^A(m) \text{ and } \tilde{H}^R(m), m = 0, \ldots, M-1.$$

Originally, these complex values will be given by $\tilde{H}^{AR}(m)$, $m = 0, \ldots, M-1$.

The resolution on the distance measurement is then:

$$\Delta r = c/2BW_{virt} = c/2M\Delta f \quad (13)$$

For M, a value equal to a power of 2 could be advantageously chosen so as to be able to obtain possibly the pulse response of the channel by IFFT.

Alternatively, the carrier frequency values will not be chosen as equally distributed but taking the values $f_0^{(k_m)} = f_{ref} + k_m \Delta f$ where $k_m$, $m = 0, \ldots, M-1$ being any distinct integers.

Originally, the complex values characteristic of the forward-backward transfer function of the transmission channel at the different carrier frequencies are provided to an artificial neural network (NN). These complex values are provided to the NN network as pairs of real values, for example, according to a first alternative, as a real part and an imaginary part or, according to a second alternative, as a module and an argument.

Without loss of generality, it will be assumed in the following that the complex values are provided to the NN network according to the first alternative.

The values $\Re(\tilde{H}^A(m))$ and $\Im(\tilde{H}^A(m))$, $m = 0, \ldots, M-1$, on the one hand, and the values $\Re(\tilde{H}^R(m))$ and $\Im(\tilde{H}^R(m))$, $m = 0, \ldots, M-1$, on the other hand can be provided as inlet values to the input layer. The latter then includes 4M neurons.

However, advantageously, according to one embodiment of the present invention, the values $\Re(\tilde{H}^{AR}(m))$ and $\Im(\tilde{H}^{AR}(m))$, $m = 0, \ldots, M-1$ are provided as input values. The inlet layer thus only includes 2M neurons.

In any case, the input layer is followed by several hidden layers (deep neural network) and an output layer. The output layer provides an estimation of the distance separating both nodes (or equivalently the propagation time on the line of sight path between both nodes).

The neural network is supervisingly trained on a set of labelled input data, in other words on a training set $\{\{\Re(\tilde{H}_i^{AR}(m)), \Im(\tilde{H}_i^{AR}(m))\}_{m=0}^{M-1}, d_i\}_{i=1}^N$ according to the embodiment of the invention, where N is the size of the training set and $\{\{\tilde{H}_i^{AR}(m)\}_{m=0}^{M-1}\}_{i=1}^N$ represents a set of values of the forward-backward transfer function of a transmission channel between two nodes of an LPWA system.

The training set could consist of simulated channel instances or measured channel instances. Training could take place in batch form off-line, and be possibly completed by an on-line training to refresh the synaptic weights.

The neural network is parameterised by the set of synaptic weights weighting input connections of different neurons. This set of synaptic weights will be noted as $\theta$ and the prediction function performed by the neural network as $f^\theta$.

The set of synaptic weights is updated during the training (or learning) phase, by means of the stochastic gradient descent (SGD) algorithm or a mini-batch (data groups of the training set) gradient descent algorithm, so as to minimise the loss function:

$$L(\theta) = \frac{1}{N} \sum_{i=1}^N \left( f^\theta(\{\tilde{H}_i^{AR}(m)\}_{m=0}^{M-1}) - d_i \right)^2 \quad (14)$$

Those skilled in the art will understand that other loss functions could be used without departing from the scope of the present invention.

The neurons of the different layers, except for the last layer, use an activation function to propagate their outputs, for example rectifier linear unit (ReLU), a leaky ReLU function or even a Softplus function, in a known manner per se.

Figure 3:
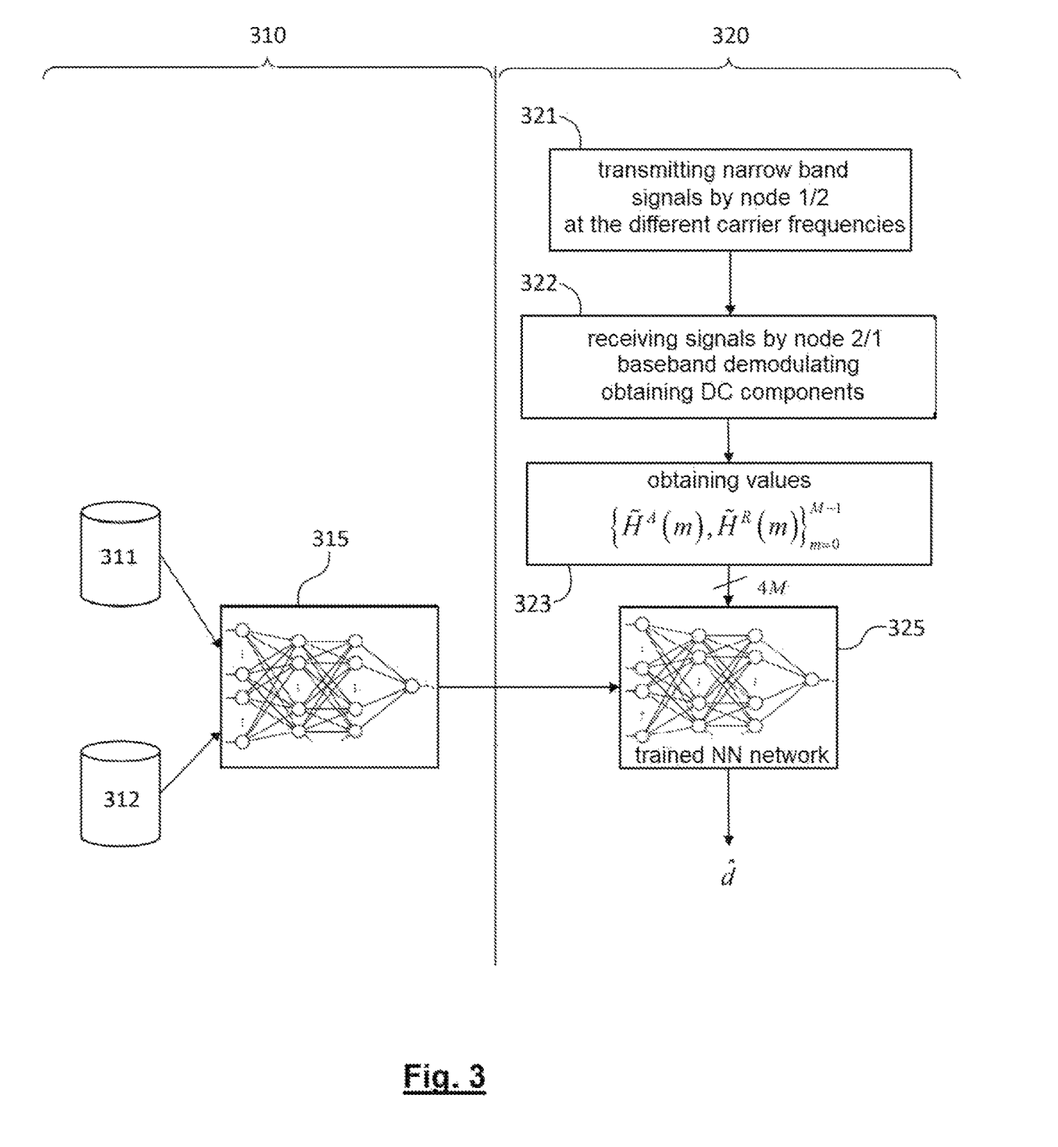
FIG. 3 schematically represents a method for measuring a distance between nodes of an LPWA network useful for understanding the present invention.

FIG. 3 schematically represents a distance measurement method between nodes of an LPWA network according to an example useful for understanding the present invention.

This method includes a training phase, 310 and an operational phase, 320.

During the training phase, the set θ of synaptic weights is updated in 315 from labelled data, by means of the stochastic gradient algorithm. The labelled data can come from simulation results and be stored in a first database 311 and/or come from georeferenced real measurements, stored in a second database 312.

By simulation results, it is meant here instances of a channel model.

Regarding the measurements, they could have been performed by connected objects equipped with GNSS receiver modules that are georeferenced using their respective GPS positions.

Alternatively, when these connected objects are mobile, detecting their passage in the proximity of a known position point (base station for example) can also allow measurement georeferencing.

Other case of measurement georeferencing could be contemplated without departing from the scope of the present invention. In particular, when a connected object follows a known or predictable trajectory, its known or predicted position could enable the corresponding measurements to be geo-referenced.

Each labelled datum comprises a complex vector with a size 2M, $\{\tilde{H}_i^A(m), \tilde{H}_i^R(m)\}_{m=0}^{M-1}$ (that is a real vector with a size 4M) representing the values of the transfer function in the forward direction and in the backward direction of a transmission channel between two nodes of the LPWA network, for the M different carrier frequencies. The labelled datum will also comprise the corresponding tag, representing the distance $d_i$ between these nodes (or the line of sight propagation time on this channel, $d_i/c$).

During the operational phase, a first node of the network successively transmits a narrow band signal on a plurality M of carrier frequencies, in 321, during a plurality of first transmission intervals as previously set out. According to one advantageous alternative embodiment, the successive carrier frequencies are spaced by a constant frequency deviation Δf. The signal can be transmitted as successive packets of pilot symbols.

The second node of the LPWA network receives the signals at the different carrier frequencies and demodulates them to baseband, in 322. The values of the forward transfer function at the different frequencies, $\tilde{H}^A(m)$, m=0, ..., M-1, are obtained from the complex amplitude of the baseband DC components. For example, this complex amplitude could be obtained by averaging the DC components on an interval when it contains upon transmission a succession of identical pilot symbols. If the pilot symbols have been generated by multiplying a reference symbol with the successive elements of an orthogonal code, the baseband DC components will be multiplied with the elements of this code before averaging.

The same operation is performed by exchanging the roles of both nodes. More precisely, the second node successively transmits a narrow band signal on the different carrier frequencies in 321, the first node receives them and translates them into baseband in 322. As previously, the values of the backward transfer function, $\tilde{H}^R(m)$, m=0, ..., M-1 are obtained from the baseband DC components, that is from the complex symbols obtained by baseband demodulation.

The 2M real values $\{\tilde{H}^A(m), \tilde{H}^R(m)\}_{m=0}^{M-1}$ (4M real values) are provided to the input layer of the trained neural network in 325. The latter calculates an estimation, $\hat{d}$, of the distance between both nodes. Equivalently, it can provide an estimation, $\hat{\tau}_0$, of the propagation time on the line of sight path.

Figure 4:
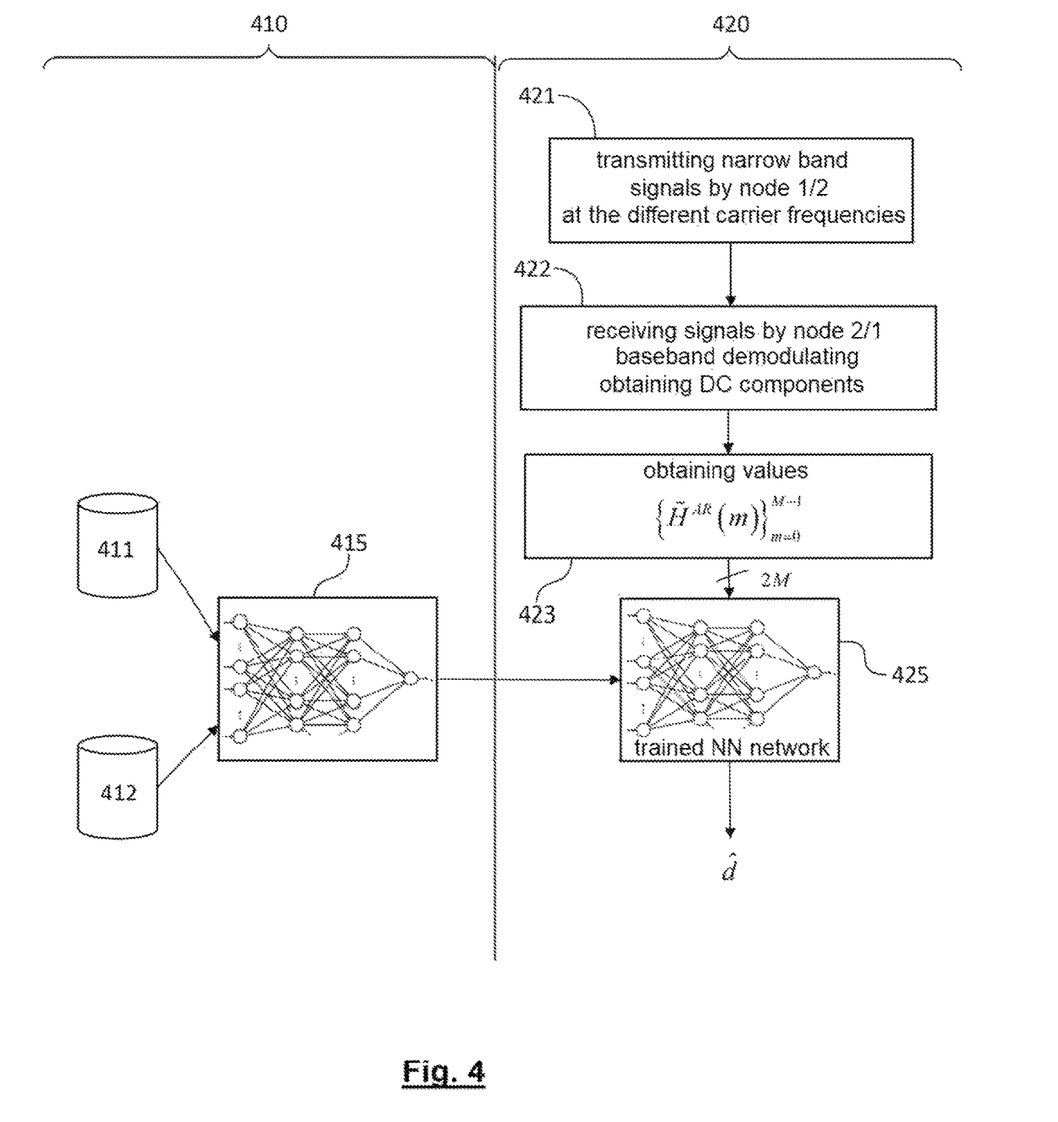
FIG. 4 schematically represents a method for measuring a distance between nodes of an LPWA network useful for understanding the present invention.

FIG. 4 schematically represents a distance measurement method between nodes of an LPWA network according to an embodiment of the present invention.

The measurement method according to this embodiment includes a training phase, 410, and an operational phase, 420.

Advantageously, the neural network is trained on complex values of a forward-backward transfer function and not on pairs of complex values of a forward transfer function and a backward transfer function.

More precisely, each labelled datum will comprise a complex vector with a size M, $\{\tilde{H}_i^{AR}(m)\}_{m=0}^{M-1}$ (real vector with a size 2M) representing the values of the forward-backward transfer function of a transmission channel between two nodes of the LPWA network, for the M different carrier frequencies.

During the training phase, the set θ of synaptic weights is updated in 415 from labelled data, by means of the stochastic gradient algorithm. As previously, the labelled data can come from simulation results and be stored in a first data base 411 and/or come from georeferenced real measurements, stored in a second data base 412.

The operational phase 420 comprises a step of transmitting narrow band signals by node 1 (resp. 2), 421, as well as a step of receiving and baseband demodulating, 422, these signals by node 2 (resp. 1), 422. Steps 421 and 422 are identical to steps 321 and 332 of FIG. 3, respectively.

Unlike FIG. 3, step 423 additionally comprises calculating the product of the forward and backward transfer functions at the different carrier frequencies, in other words the complex values $\tilde{H}^{AR}(m) = \tilde{H}^A(m) \cdot \tilde{H}^R(m)$, m=0, ..., M-1.

This calculation can be performed by one of the nodes, typically a base station, or even a remote server.

The M complex values $\{\tilde{H}^{AR}(m)\}_{m=0}^{M-1}$ (2M real values) are provided to the input layer of the trained neural network in 425. The latter calculates an estimation, $\hat{d}$, of the distance between both nodes. Equivalently, it can provide an estimation, $\hat{\tau}_0$, of the propagation time on the line of sight path.

The embodiment is more compact than that of FIG. 3 with half as many neurons in the input layer. As compensation, it necessitates a prior calculation of the product of the forward transfer functions and backward transfer functions at the different carrier frequencies.

The distance estimation method according to the invention enables the distance (the line of sight propagation time resp.) between both nodes to be provided with a good spatial (time resp.) resolution. The neural network enables this information inherently present in measurements to be extracted, without having to build a complex parametric model.

It should be also noted that the network can continue to supervisingly learn on line, after the prior learning phase. For example, if a measurement of the forward-backward transfer function between both georeferenced nodes is performed, the corresponding labelled datum can be used to update parameters of the neural network.

Figure 5:
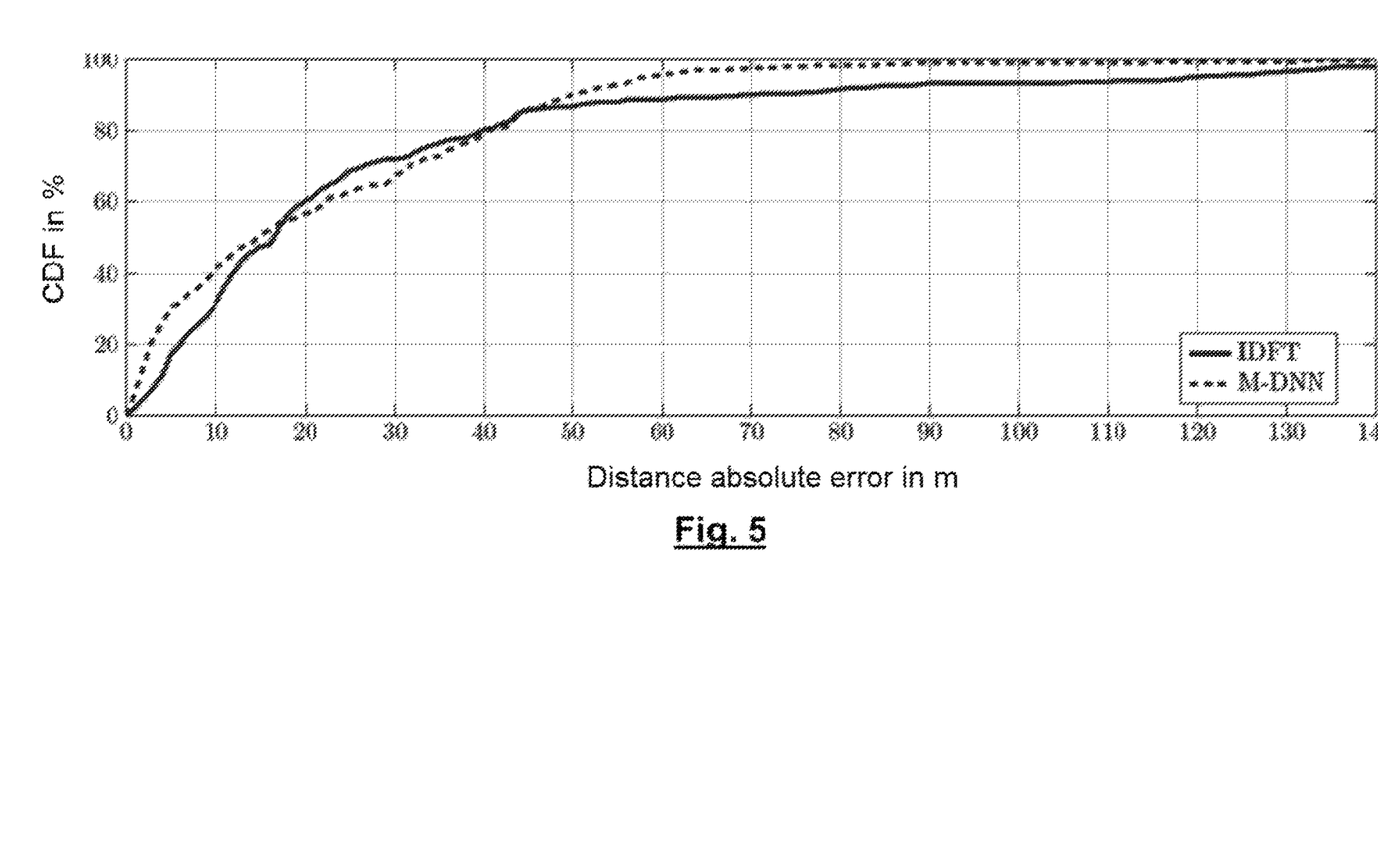
FIG. 5 illustrates the performance of a distance estimation method according to the invention and a distance estimation method known from the state of the art.

FIG. 5 illustrates the performance of a distance estimation method according to the invention and a distance estimation method known from the state of the art. More precisely, FIG. 5 gives the distance error distribution function during a measurement run, by using a distance estimation method according to the state of the art (designated as IDFT) and an estimation method according to one embodiment of the present invention of FIG. 4 (designated as M-DNN for Mixed-data Deep Neural Network) in so far as training has been carried out both on synthetic and real data).

The IDFT method consisted in performing IDFT (inverse Discrete Fourier Transform) of the values of the forward transfer functions to obtain the pulse response of the transmission channel in the time domain, and then selecting the first path to determine the propagation time on the line of sight path and deducing the distance between nodes therefrom.

The M-DNN method according to the embodiment of the present invention used a neural network trained on a database generated by Monte-Carlo simulation on transmission channels having the characteristics given in Table 1 below.

TABLE 1

| Parameter | Symbol | Value |
|---|---|---|
| Path amplitude ratio | $\beta = \alpha_1/\alpha_0$ | −30; 5; −5, −3, −1, 0, 1, 3, 5, 10 dB |
| Path delay difference | $\Delta\tau = \tau_1 - \tau_0$ | 0:10:200 m |
| Signal-to-noise ratio | $E_s/N_0$ | −30; 5; 50 dB |
| Monte Carlo runs | | 1500 |

The transmission channels are supposed to comprise a line of sight path (with an attenuation coefficient $\alpha_0$ and a propagation time $\tau_0$) as well as a non-line of sight path (with an attenuation coefficient $\alpha_1$ and a propagation time $\tau_1$). The signal to noise ratio upon reception has been noted as $E_s/N_0$. The number of simulations for each combination of the values of parameters of table I was 1500.

The number M of carrier frequencies was 16, with a frequency deviation $\Delta f$ of 200 kHz corresponding to a virtual bandwidth $(M-1)\Delta f$ of 3 MHz. The bandwidth of the signals transmitted to the different carrier frequencies was 10 kHz.

The neural network included 3 hidden layers, each comprising 128 neurons. The neurons of the different layers (except for the output layer) used the ReLU function as an activation function. The network learning has been made by means of a mini-batch gradient descent algorithm with 32 data samples, and the learning rate was $\alpha=10^{-3}$.

The figure shows that 90% of the estimation errors made by M-DNN the distance estimation method are lower than 45 m whereas 90% of the estimation errors made by the IDFT estimation method are only lower than 60 m.

Figure 6:
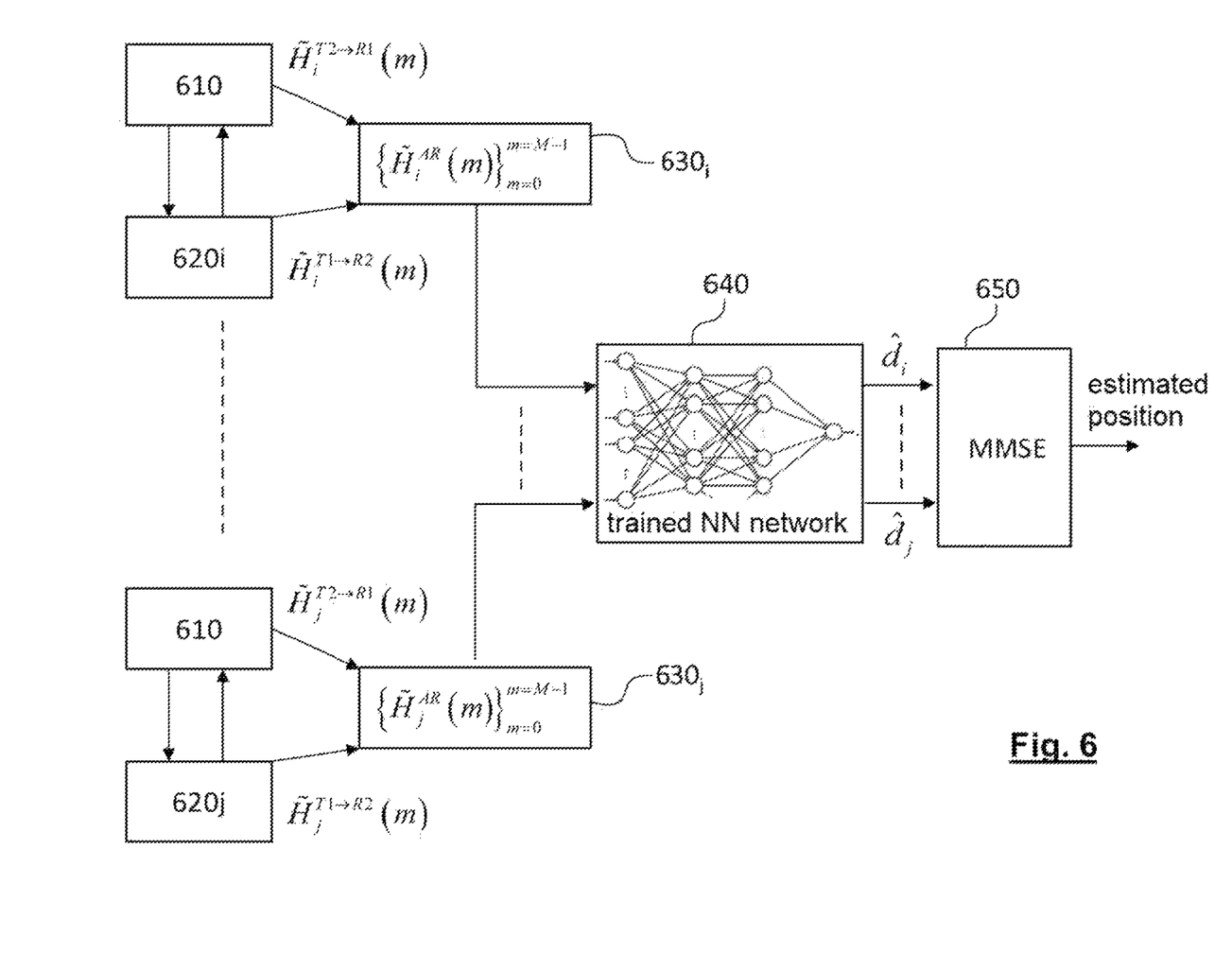
FIG. 6 schematically represents a first method for estimating a position of a node of LPWA network using a distance estimation method according to the present invention.

FIG. 6 schematically represents a first method for estimating the position of a node of LPWA network using a distance estimation method according to the present invention.

The method for estimating the position of a node illustrated in FIG. 6 uses a distance estimation method according to the embodiment of the invention of FIG. 4.

The method for estimating the position of the node resorts to a number N ($N \geq 3$ in a plane) of anchor nodes, that is network nodes the position of which is known or has been previously determined.

The node the position of which is to be determined, 610, transmits a narrow band signal on the plurality M of carrier frequencies successively. The transmitted signal is received by the plurality of anchor nodes and baseband demodulated, to estimate values of the forward transfer function of the transmission channel with each anchor node, at the frequencies in question.

Conversely, the anchor nodes (only two anchor nodes $620_i$ and $620_j$ have been represented) each transmit a narrow band signal on said plurality M of carrier frequencies. The anchor nodes can transmit in turn or simultaneously with distinct orthogonal codes. The node the position of which is to be determined performs baseband demodulation of each of these signals and determines the values of the backward transfer functions of the channel at the different frequencies.

The values of the forward transfer functions are multiplied (in $630_i$ and $630_j$) with the values of the corresponding backward transfer functions, at the same carrier frequencies, to obtain complex values representative of the forward-backward transfer functions, $\tilde{H}_i^{AR}(m)$, $m=0, \ldots, M-1$, of all the transmission channels between the node, 610, and the anchor nodes within reach.

The complex value components representative of the forward-backward transfer functions are then transmitted as vectors (with a size 2M) to a previously trained neural network, 640, as described in connection with FIG. 4. The neural network then determines distances separating the node 610 from the different anchor nodes.

The vectors in question can be sequentially multiplexed at the input of the neural network and the estimated distances are then demultiplexed at the output of the network.

Alternatively, a neural network with a size 2N·M operating together on all the vectors and providing an estimation of the N distances in parallel could be provided.

Further alternatively, each of the anchor nodes (for example the base stations) can hoist a previously trained neural network. This anchor node then calculates complex values representative of the forward-backward transfer function between the node of interest 610 and itself.

Whatever the contemplated alternative, distances thus estimated by the neural network(s) are provided to a position prediction module, 650, estimating the position p of the node of interest by means of an MMSE (Minimum Mean-Square Error) algorithm. More precisely, the position of the node of interest is estimated by minimising the cost function:

$$F(p) = \sum_{i=1}^{N} (\|p - p_i\| - \hat{d}_i)^2 \qquad (15)$$

In other words:

$$\hat{p} = \arg\min_{p}(F(p)) \qquad (16)$$

Alternatively, position estimation can be integrated within the neural network itself as an output layer, the latter then using a linear activation function. To speed up training of the neural network, it could be splitted into two successive blocks (transfer learning), the first one being trained in a distance estimation as described in connection with FIGS. 3 and 4, the second one being trained in position estimation from the distances to the anchor nodes. In other words, the first block of layers is simply intended to distance estimation and the second block to estimate the position from the previously estimated distances.

Figure 7:
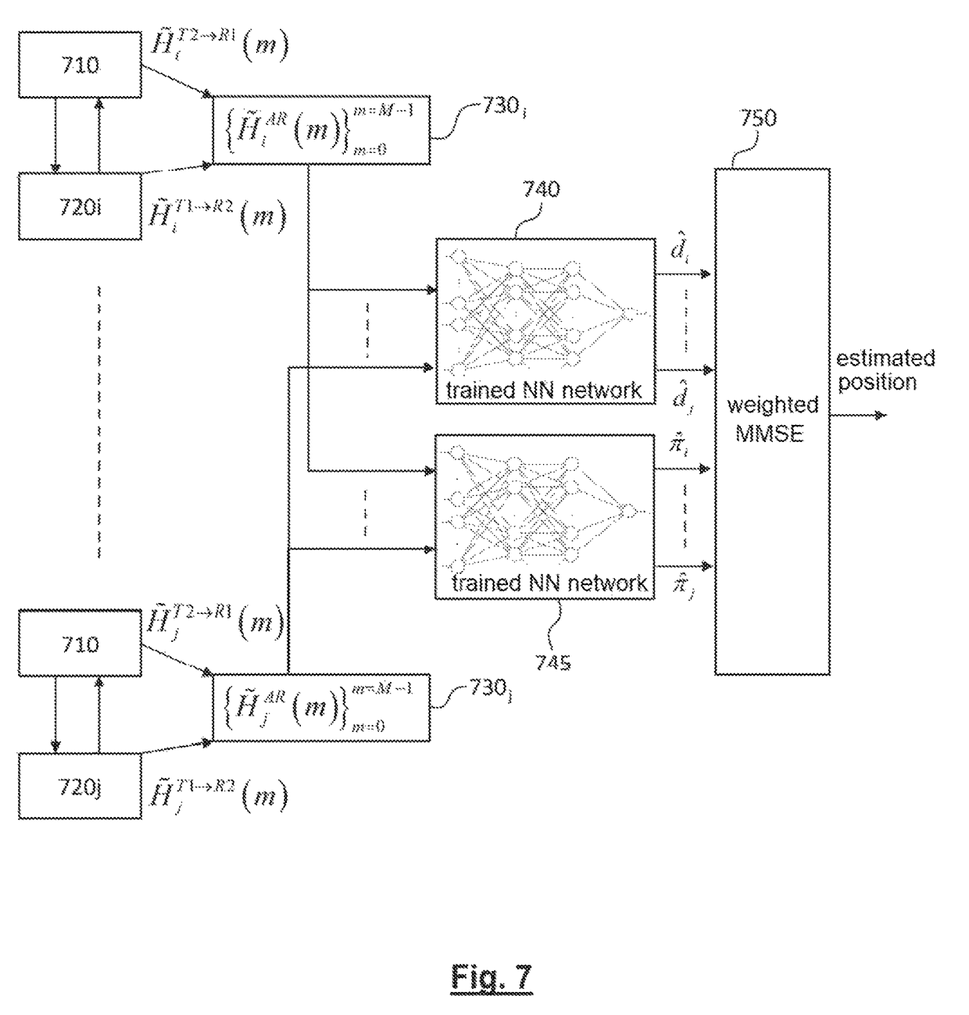
FIG. 7 schematically represents a second method for estimating a position of a node of LPWA network using a distance estimation method according to the present invention.

FIG. 7 schematically represents a second method for estimating the position of a node of LPWA network using a distance estimation method according to the present invention.

The method for estimating the position of a node illustrated in FIG. 7 again uses a distance estimation method according to the embodiment of the invention of FIG. 4.

Elements designated by references 710, 720$_{i/j}$, 730$_{i/j}$, 740 are identical to elements 610, 620$_{i/j}$, 630$_{i/j}$, 640 respectively and their description will be therefore not repeated here.

If the transmission channel between the node of interest 710 and the anchor node 720$_i$ is considered, the values of the forward transfer functions are multiplied in 730$_i$ with the values of the corresponding backward transfer functions, at the same carrier frequencies, to give an M-tuple of complex values, or equivalently a real vector with a size 2M, representative of the forward-backward transfer function of the transmission channel between the node of interest and the anchor node 720$_i$.

The N vectors representative of the different transmission channels are provided, on the one hand, to a first artificial neural network 740, identical to the artificial neural network 640 and, on the other hand, to a second artificial neural network 745.

The first neural network provides estimation of distances between the point of interest and the anchor nodes. The same alternatives as those described in connection with FIG. 6 are here applicable.

The second neural network 745, performs classification of each channel of the M-tuple of complex values representing the forward-backward transfer function of this channel. More precisely, the second neural network is configured to provide quality factors $\hat{\pi}_i$, i=1, ..., N. The quality factor $\hat{\pi}_i$ is defined as a score of belonging to LOS or NLOS category, in other words the probability that the transmission channel between nodes 710 and 720$_i$ belongs to either category. The neural network is previously trained on complex values representative of the forward-backward transfer functions, that is on M-tuples $\{\tilde{H}^{AR}(m)\}_{m=0}^{m=M-1}$ obtained by measurement and/or simulation, each M-tuple being labelled by the LOS/NLOS type of the transmission channel in question. By simulation, it is meant here the draw for parameters of a predetermined model of a transmission channel.

The quality factors $\hat{\pi}_i$, i=1, ..., N, are provided with the corresponding distance estimations, $\hat{d}_i$, to the position estimation module 750. This estimation module attempts to minimise a cost function, weighting the estimated distance deviation with the corresponding estimation quality factor:

$$F_\pi(p) = \sum_{i=1}^{N} \hat{\pi}_i (\|p - p_i\| - \hat{d}_i)^2 \quad (17)$$

where p is a vector defining the position of the node 710 in a given reference frame and $p_i$, i=1, ..., N are vectors defining the respective (known) positions of the anchor nodes 720$_i$ in the same reference frame, and N is the number of anchor nodes considered.

The estimated position is then that minimising the cost function:

$$\hat{p} = \arg\min_{p}(F_\pi(p)) \quad (18)$$

Different alternatives could be contemplated by those skilled in the art without departing from the scope of the invention. In particular, instead of multiplexing the vectors representative of the forward-backward transfer functions at the input of the neural networks 740 and 745, neural networks 740$_i$ and 745$_i$ associated with each transmission channel could be provided.

The neural networks 740 and 745 (or 740$_i$ and 745$_i$) could possibly be fused to be replaced with 2-output neural networks, a first output giving an estimation of the distance and a second output giving the quality factor.

In any case, the position estimation given by expressions (17) and (18) also generally allows a more accurate estimation than that given by expressions (15) and (16).

The invention claimed is:

1. A method for estimating a distance between a first node and a second node of an LPWA (Low-Power Wide-Area) network, the method comprising:
   successively transmitting, by the first node and the second node respectively, first and second narrow band signals on a plurality M of carrier frequencies;
   successively receiving, by the second node and the first node respectively, the transmitted second and first narrow band signals;
   baseband demodulating the received second and first narrowband signals;
   determining a plurality of complex values representative of a forward-backward transfer function of a transmission channel between the first and second nodes, after baseband demodulating, at the plurality M of carrier frequencies, the received second and first narrowband signals received by the second node and the first node respectively, said plurality of complex values, $\tilde{H}^{AR}(m)$, m=0, ..., M−1, representative of the forward-backward transfer function of the transmission channel being obtained by determining a product of the complex values, $\tilde{H}^{AR}(m)$, m=0, ..., M−1 of a forward transfer function of the transmission channel, at the plurality M of carrier frequencies, with respective complex values, $\tilde{H}^{AR}(m)$, m=0, ..., M−1 of a backward transfer function of the transmission channel, at the plurality M of carrier frequencies; and
   estimating the distance separating the first node and the second node by applying the plurality of complex values representative of the forward-backward transfer function to a previously supervisingly trained artificial neural network.

2. The distance estimation method according to claim 1, wherein the plurality M of carrier frequencies are chosen equally distributed on a virtual band with a width (M −1)Δf, where Δf is deviation between two consecutive carrier frequencies of the plurality M of carrier frequencies.

3. The distance estimation method according to claim 1, wherein the neural network has an input layer with 2M neurons receiving (a)M real parts ($\Re(\tilde{H}_i^{AR}(m))$, m=0, ..., M−1) of the complex values representative of the forward-backward transfer function and (b) M imaginary parts ($\Im(\tilde{H}_i^{AR}(m))$, m=0, ..., M−1) of the complex values representative of the forward-backward transfer function.

4. The distance estimation method according to claim 3, further comprising training, during a supervised training phase, the neural network using a set of labelled data, each labelled datum comprising a complex vector representing values of the forward-backward transfer function between two nodes of an LPWA network, for the plurality of M carrier frequencies, and as a tag, a corresponding distance between the two nodes.

5. The distance estimation method according to claim 4, wherein the labelled data are obtained from simulated propagation channels.

6. The distance method estimation according to claim 1, wherein the successively transmitting and receiving the first and second narrow band signals is performed over a total duration ($T_{MC}$) lower than a coherence time of the transmission channel.

7. A method for estimating a position of a node of interest in an LPWA network comprising a plurality N of anchor nodes having known positions, wherein the distance between the node of interest and each of the plurality of anchor nodes is estimated by the distance estimation method according to claim 1, the position of the node of interest being obtained by minimising a cost function $$F(p) = \sum_{i=1}^{N} (\|p - p_i\| - \hat{d}_i)^2$$

where $\hat{d}_i$, i=1, ..., N are the estimated distances between the node of interest by the neural network and the plurality of anchor nodes, $p_i$, i=1, ..., N, are vectors representing the respective positions of the plurality of anchor nodes and p is a vector representing the position of the node of interest.

8. A method for estimating a position of a node of interest in an LPWA network comprising a plurality N of anchor nodes having known positions, wherein the distance between the node of interest and each of the plurality of anchor nodes is estimated using the distance estimation method according to claim 1, the position of the node of interest being obtained by minimising a cost function $$F_\pi(p) = \sum_{i=1}^{N} \hat{\pi}_i (\|p - p_i\| - \hat{d}_i)^2$$

where $\hat{d}_i$, i=1, ..., N are the estimated distances between the node of interest and plurality of anchor nodes by the neural network $p_i$, i=1, ..., N are vectors representing the respective positions of the plurality of anchor nodes, p is a vector representing the position of the node of interest, $\hat{\pi}_i$, i=1, ..., N are quality factors indicative of the LOS/NLOS (Line of Sight/Non Line of Sight) category of the transmission channels between the node of interest and the plurality of anchor nodes, each quality factor relating to a transmission channel between the node of interest and an anchor node of the plurality of anchor nodes being provided by a second artificial neural network receiving as an input, real and imaginary parts of the complex values representative of the forward-backward transfer function.

9. The distance estimation method according to claim 2, wherein the neural network has an input layer with 2M neurons receiving (a)M real parts ($\Re(\tilde{H}_i^{AR}(m))$, m=0, ..., M-1) of the complex values representative of the forward-backward transfer function and (b) M imaginary parts ($\Im(\tilde{H}_i^{AR}(m))$, m=0, ..., M-1) of the complex values representative of the forward-backward transfer function.

10. The distance estimation method according to claim 9, further comprising training, during a supervised training phase, the neural network using a set of labelled data, each labelled datum comprising a complex vector representing values of the forward-backward transfer function between two nodes of an LPWA network, for the plurality of M carrier frequencies, and as a tag, a corresponding distance between the two nodes.

11. The distance estimation method according to claim 10, wherein the labelled data are obtained from measured, real propagation channels between georeferenced nodes.

12. The distance method estimation according to claim 2 wherein the successively transmitting and receiving the first and second narrow band signals is performed over a total duration ($T_{MC}$) lower than a coherence time of the transmission channel.

13. The distance method estimation according to claim 3 wherein the successively transmitting and receiving the first and second narrow band signals is performed over a total duration ($T_{MC}$) lower than a coherence time of the transmission channel.

* * * * *